(12) United States Patent
Creighton et al.

(10) Patent No.: US 6,234,165 B1
(45) Date of Patent: May 22, 2001

(54) BABY BOTTLE WARMER

(76) Inventors: Kevin A. Creighton, 1102 Sea Reef Dr., San Diego, CA (US) 92154; Paul J. Wiese, 9974 Scripps Ranch Blvd., No. 164, San Diego, CA (US) 92131; Mark B. Grantham, 12991 Via Esperia, Del Mar, CA (US) 92014

( * ) Notice: Subject to any disclaimer, the term of this patent is extended or adjusted under 35 U.S.C. 154(b) by 0 days.

(21) Appl. No.: 09/649,759

(22) Filed: Aug. 28, 2000

(51) Int. Cl.[7] .................................................. F24J 1/00
(52) U.S. Cl. .............................. 126/263.06; 126/263.08; 126/263.09; 215/11.1
(58) Field of Search ........... 126/263.01, 263.05–263.09, 126/263.03, 263.1, 262, 261; 215/11.1, 11.2, 11.3; 62/457.3, 457.2, 530

(56) References Cited

U.S. PATENT DOCUMENTS

| | | | |
|---|---|---|---|
| 2,300,793 | * 11/1942 | Martin | 126/263.1 |
| 2,968,932 | * 1/1961 | Vance et al. | 126/263.07 |
| 3,561,424 | * 2/1971 | Failla | 126/263.09 |
| 3,675,637 | * 7/1972 | Trimble | 126/263.05 |
| 4,002,235 | * 1/1977 | Donnelly | 126/263.07 |
| 4,510,919 | 4/1985 | Benmussa . | |
| 4,522,190 | 6/1985 | Kuhn et al. . | |
| 4,762,113 | 8/1988 | Hamasaki . | |
| 4,771,761 | 9/1988 | Doukhan et al. . | |
| 4,809,673 | 3/1989 | Charvin . | |
| 4,823,769 | 4/1989 | Semaan . | |
| 5,220,909 | 6/1993 | Pickard et al. . | |
| 5,255,812 | * 10/1993 | Hsu | 126/263.01 |
| 5,355,869 | 10/1994 | Pickard et al. . | |
| 5,465,707 | 11/1995 | Fulcher et al. . | |
| 6,123,065 | * 9/2000 | Teglbjarg | 126/263.1 |

* cited by examiner

Primary Examiner—James C. Yeung
(74) Attorney, Agent, or Firm—Law Offices of James D. McFarland

(57) ABSTRACT

A method and apparatus utilizing an exothermic reaction to generate a heated gas that warms a baby bottle, providing a baby bottle warmer that is portable, convenient to use, simple, and lightweight. In one embodiment, a heating vessel holds the baby bottle and a vessel top removably attaches to an upper section of the heating vessel. A solution release mechanism situated in a lower section of said heating vessel includes a solution container having an activating liquid disposed therein, and a device for puncturing the solution container responsive to pressure supplied by insertion of the baby bottle. A heating element situated below the solution release mechanism includes a material for exothermically reacting with the activating liquid to generate the heated gas. In one embodiment, when a baby bottle is inserted into the bottle warmer, an upper and lower unit are pressured together to release a saline solution onto a magnesium wafer. Some embodiments of the baby bottle warmer comprise a system for spacing apart the lower and upper units, which is useful for storage and/or travel. Upon insertion of the baby bottle and application of pressure, the system disengages, thereby allowing the upper and lower units to move together.

17 Claims, 5 Drawing Sheets

BABY BOTTLE WARMER

BACKGROUND OF THE INVENTION

1. Field of the Invention

The present invention generally relates to a self-contained baby bottle warmer that generates heat via an exothermic reaction actuated by insertion of the baby bottle.

2. Description of Related Art

In many instances it can be difficult and inconvenient to locate a suitable heat source to warm food for eating or beverages for drinking. A variety of configurations have been disclosed that utilize heat generated by an exothermic reaction between a liquid and a chemical for the purpose of heating food. For example Semaan, in U.S. Pat. No. 4,873,769 issued Apr. 25, 1989, discloses a water-containing ampule and a quantity of calcium oxide situated within a resilient housing disposed within an insulating envelope that has a cover. Semann discloses means to cause a rod to come into crushing contact with the glass ampule so that the water within the ampule is distributed in vigorously reactive contact with the calcium oxide, thereby heating the food. Other examples of self-contained heating apparatus are shown in U.S. Pat. Nos. 4,771,761, 5,220,99, 4,809,673 5,355,869, 5,465,707 and 4,510,919.

An exothermic reaction that provides an alternative to calcium oxide is disclosed in U.S. Pat. No. 4,522,190 to Kuhn et al., which discloses a heater material for use in heating food. The heat pad includes a composite material consisting of a supercorroding metallic alloy power disbursed throughout a porous polyethylene matrix. The heat pad is activated with a suitable electrolyte fluid.

Unfortunately, an exothermic reaction-based warmer has not been developed in a form suitable for heating baby bottles. Convenience and time savings are both very important for time-starved parents, and it would be useful to provide a baby bottle warmer that is portable, convenient to use, simple, and lightweight. Currently there are baby bottle warmers on the market that utilize various types of electrical energy sources to warm a baby bottle for infants. One bottle warmer connects to a car's battery to provide energy, using an adapter connected to the car's cigarette lighter to provide heat to warm a baby bottle. Another version of baby bottle warmer connects to a standard household electrical outlet.

One disadvantage of an electrically-heated baby bottle warmer is related to the requirement to first find an electrical source and then connect the warmer to the source with the proper adapter. This requires a parent who already is loaded down with baby gear to carry around unwieldy cords, cables and adapters in order to ensure that the baby's bottle will be warmed wherever the need arises. In some locations, even finding a suitable source of electrical energy can be difficult outside of the house; for example in grocery stores, restaurants, and at picnics.

SUMMARY OF THE INVENTION

In order to overcome the limitations of prior art baby bottle warmers, and provide a baby bottle warmer that is portable, convenient to use, simple, and lightweight, the present invention provides a method and apparatus that utilizes an exothermic reaction to generate heated gas that warms a baby bottle. In one embodiment, when a baby bottle is inserted into the bottle warmer, a solution release mechanism releases a saline solution onto a magnesium wafer that starts an exothermic reaction. This exothermic reaction creates a safe, non-toxic heated gas that warms the bottle.

A baby bottle warmer that generates an exothermic reaction to heat a baby bottle with a heated gas comprises a heating vessel for holding the baby bottle and a vessel top that removably attaches to an upper section of the heating vessel. A solution release mechanism is situated in a lower section of the heating vessel, comprising a solution container having an activating liquid disposed therein, and a device for puncturing the solution container responsive to pressure supplied by insertion of the baby bottle into the lower section of the heating vessel. A heating element is situated below the solution release mechanism, the heating element comprising a material for exothermically reacting with the activating liquid to generate the heated gas. In some embodiments the solution release mechanism comprises a lower unit, an upper unit, and a puncturing device coupled to at least one of the lower and upper units. The solution container is situated between the upper and lower units, so that the solution container is punctured by the puncturing device responsive to pressure supplied by insertion of the baby bottle.

Some embodiments of the baby bottle warmer comprise a system for spacing apart the lower and upper units, which is useful for storage and/or travel. Upon insertion of the baby bottle and corresponding application of pressure to the upper unit, the system disengages, thereby allowing the upper and lower units to move together. In one such embodiment the lower unit includes a plurality of alignment pins and the upper unit includes a plurality of alignment holes formed to receive the alignment pins. The alignment pins each have an indented ring and the alignment holes have an inner flange that engages the alignment rings such that the upper and lower units are initially spaced apart to avoid unintended puncture of the solution container, and upon application of downward pressure to the release mechanism, the indented ring and inner flange disengage and the alignment pins move axially within the alignment holes, and the puncturing device punctures the solution container and releases the activating liquid into contact with the heating element to generate heated gas in an exothermic reaction.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

One embodiment of invention is described in the following description with reference to the Figures, in which like numbers represent the same or similar elements.

Figure 1:
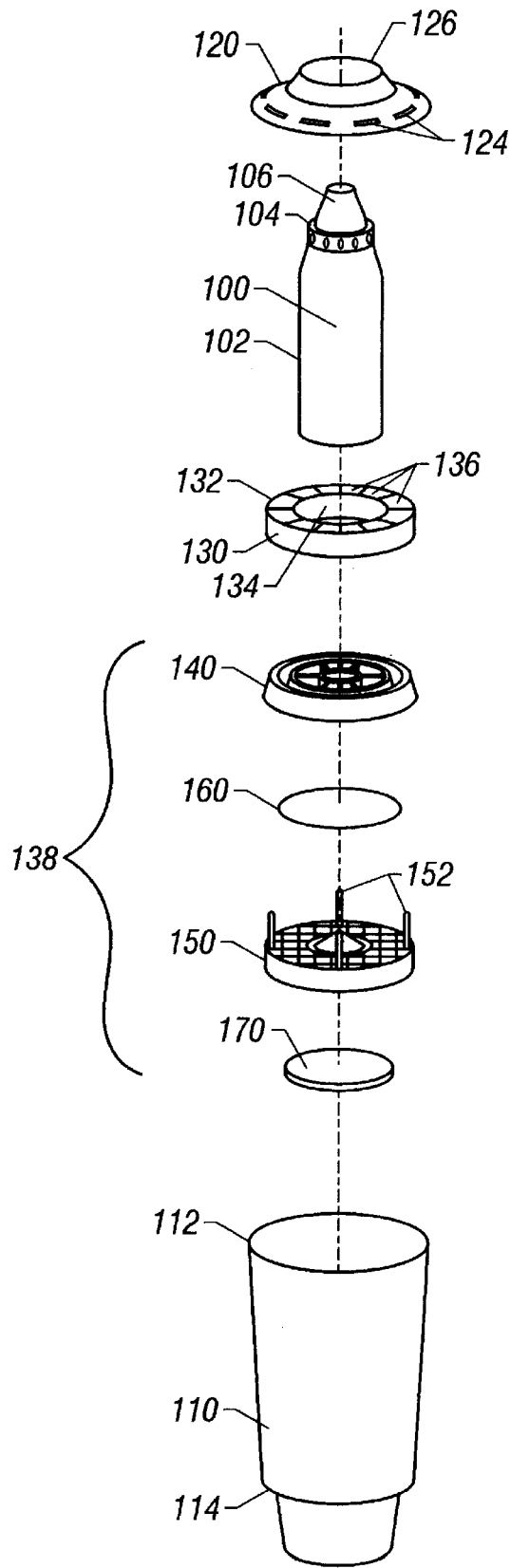
FIG. 1 is an exploded perspective view of one embodiment of a baby bottle warmer.

Reference is first made to FIG. 1, which is a perspective view of one embodiment of the baby bottle warmer illustrating the apparatus in exploded view. A baby bottle 100, which is to be heated, comprises any suitable type of baby bottle assembly such as a bottle 102 and a standard screw-on nipple assembly 104. Typically, the nipple assembly includes a cover 106 that is snapped on top of the nipple to protect it from external contaminants. In use, the baby bottle 102 is first filled with a fluid such as baby formula, and then chilled by, for example, storing it in a cooler or a refrigerator.

The apparatus for warming the bottle resides in a heating vessel 10 that in one embodiment has the shape of a tapered cylinder and comprises a suitable insulative material, such as Styrofoam. The heating vessel has an upper lip 112 on its topmost rim in order to provide a means to attach a vessel top 120 thereto. The heating vessel also has an annular collar 114 in a lower section that is designed to hold a solution release mechanism 138, as is described elsewhere in more detail. In some embodiments the heating vessel may include longitudinal ribs formed thereon for structural rigidity.

Figure 2:
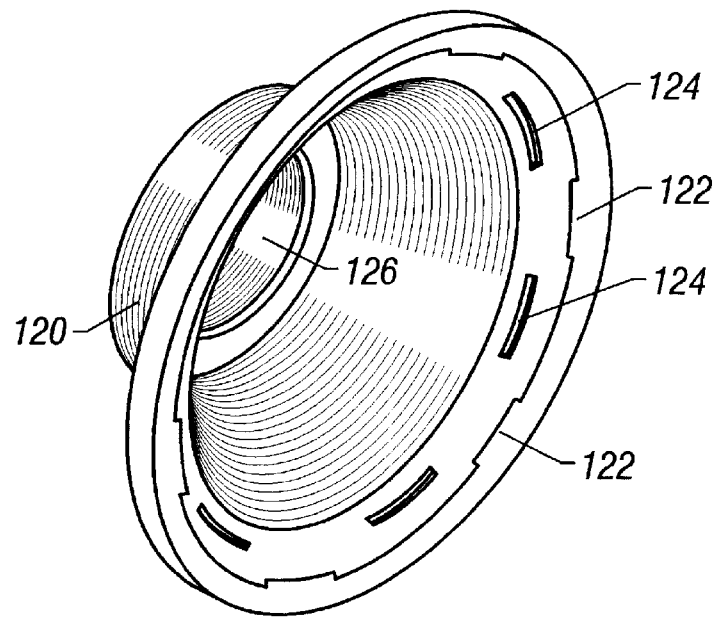
FIG. 2 is a side perspective view of the vessel top.

Reference is now made to FIG. 2 in connection to FIG. 1. FIG. 2 shows a side perspective view of the vessel top 120. The bottom side of the vessel top includes a plurality of ridges 122 that extend outwardly to attach over the upper lip 112 of the heating vessel 110. Next to the ridges 122 on the vessel top, a plurality of vents 124 are provided for the purpose of preventing excessive buildup of pressure by allowing a small amount of heated gas to escape. However, the vents 124 are made small enough to facilitate heating and retain substantial heat within the vessel, so as to properly heat the baby bottle. The heating vessel top 120 also includes a circular opening 126 in its upper end that is designed to engage with the cover 106 of the baby bottle assembly. The vessel top 120 is formed of any suitable material, such as plastic.

Referring again to FIG. 1, the baby bottle warmer apparatus includes a positioning ring 130 that fits within the heating vessel 110 for the purpose of aligning the baby bottle approximately along the central axis defined by the vessel's cylindrical shape. The positioning ring has an outer diameter designed to reside within the heating vessel 110 at a location that corresponds to an approximate midpoint of the bottle. The positioning ring 130 includes an outer ring 132 that engages the inside of the heating vessel 110, and an inner ring 134 designed to allow passage of the bottle 102. In between the inner and outer rings, a plurality of vents 136 are provided to allow passage of heated gas to facilitate heating of the baby bottle.

In operation, the baby bottle is heated by an exothermic reaction initiated by releasing a solution which then interacts with a heating element to generate a heated gas. In one embodiment, a solution release mechanism 138 includes an upper unit 140, a lower unit 150, and a solution container 160 situated there between. A heating element 170 is situated below the solution release mechanism, so that the released solution flows downward and into contact with it.

The solution within the solution container 160 comprises a suitable liquid that, when contacted with the heating element 170, generates an exothermic reaction that creates heat in the form of a heated gas. A sufficient amount of the activating solution (e.g. 2 mil) is provided in order to react with the heating element, thereby generating a predetermined amount of heat to heat the baby bottle. In one embodiment, the solution in the solution container includes an electrolyte such as a standard saline solution, and the heating element 170 comprises a magnesium-iron (Mg-Fe) wafer that reacts with the electrolyte to generate an exothermic reaction. One example of a suitable heating element and solution is disclosed in U.S. Pat. No. 4,522,190 to Kuhn et al., which discloses a heating element that includes a composite material consisting of a supercorroding metallic alloy power disbursed throughout a porous polyethylene matrix. The heating element shown by Kuhn et al. is readily activated with a suitable electrolyte fluid, such as a saline solution. Another example of a heating element includes calcium oxide.

Reference is now made to FIGS. 3, 4, 5, 6, and 7 in connection with FIG. 1, to describe the solution release mechanism and its operation.

Figure 3:
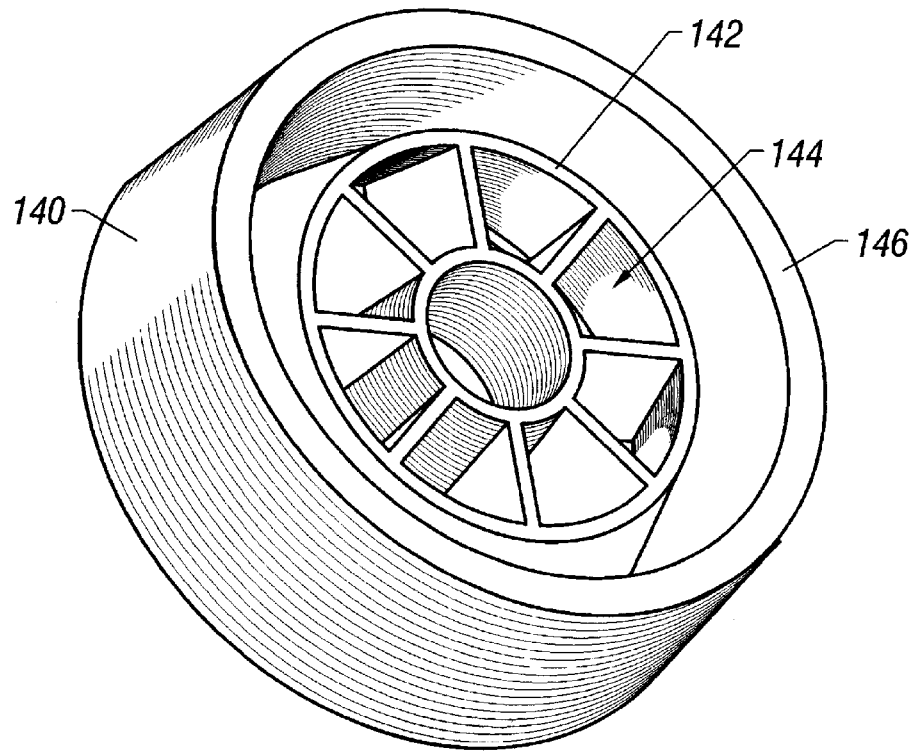
FIG. 3 is a perspective view of the upper unit of the solution release mechanism viewed from the top.
Figure 4:
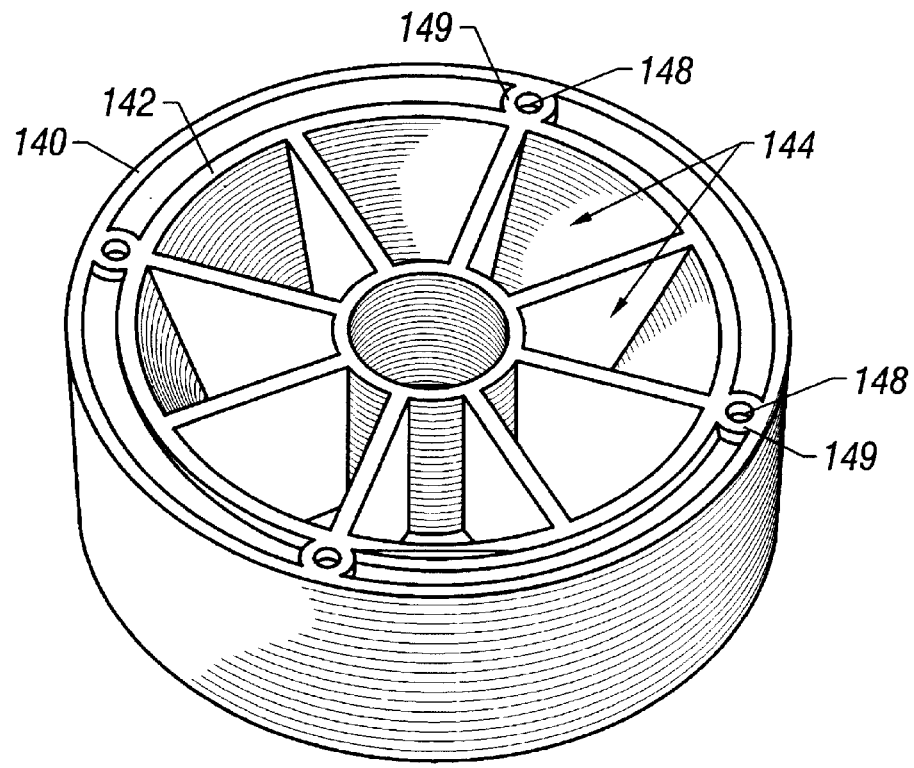
FIG. 4 is a perspective view of the upper unit of the solution release mechanism viewed from the bottom.

FIG. 3 is a perspective view of the upper unit 140 viewed from the top, and FIG. 4 is a perspective view of the upper unit 140 viewed from the bottom. A central section of the upper unit 140 includes a conical element 142 that is wider at the bottom and narrower at the top, and also includes a plurality of vents 144. The tapered shape of the conical element has the effect of concentrating the heated gas as it flows upwardly, which is described in more detail elsewhere. The upper edge of the conical element 142 is designed to receive the bottom of the baby bottle 102. In order to facilitate proper positioning of the baby bottle, the upper unit includes an outer ring 146 that extends above the upper edge of the conical element, so that the bottle 102 is situated on top of the conical element and cradled within the outer ring 146.

The upper unit 140 also includes a plurality of alignment holes 148 extending upwardly from its bottom side (shown in FIG. 4), each alignment hole having an inner flange 149 proximate to its entrance.

Figure 5:
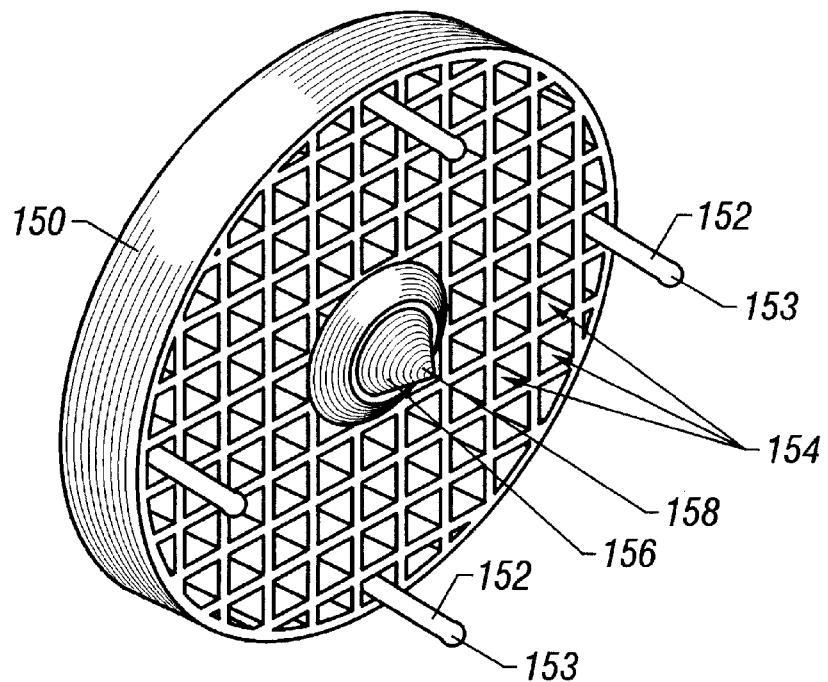
FIG. 5 is a perspective view of the lower unit of the solution release mechanism viewed from the side.

Reference is now made to FIG. 5 which is a perspective view of the lower unit 150. A plurality of alignment pins 152 are provided that engage with the alignment holes 148 of the upper unit, as will be described. Each of the alignment pins includes an annular indented ring 153 near its tip, which, as will be described, provides a mechanism to hold the upper and lower units spaced apart prior to actuation. The lower unit 150 also includes a plurality of vents 154 to allow passage of the heated gas, and a centrally-located conical section 156 with a sharp tip 158 that is designed to puncture the solution bag when the lower and upper units are pressured together.

Figure 6:
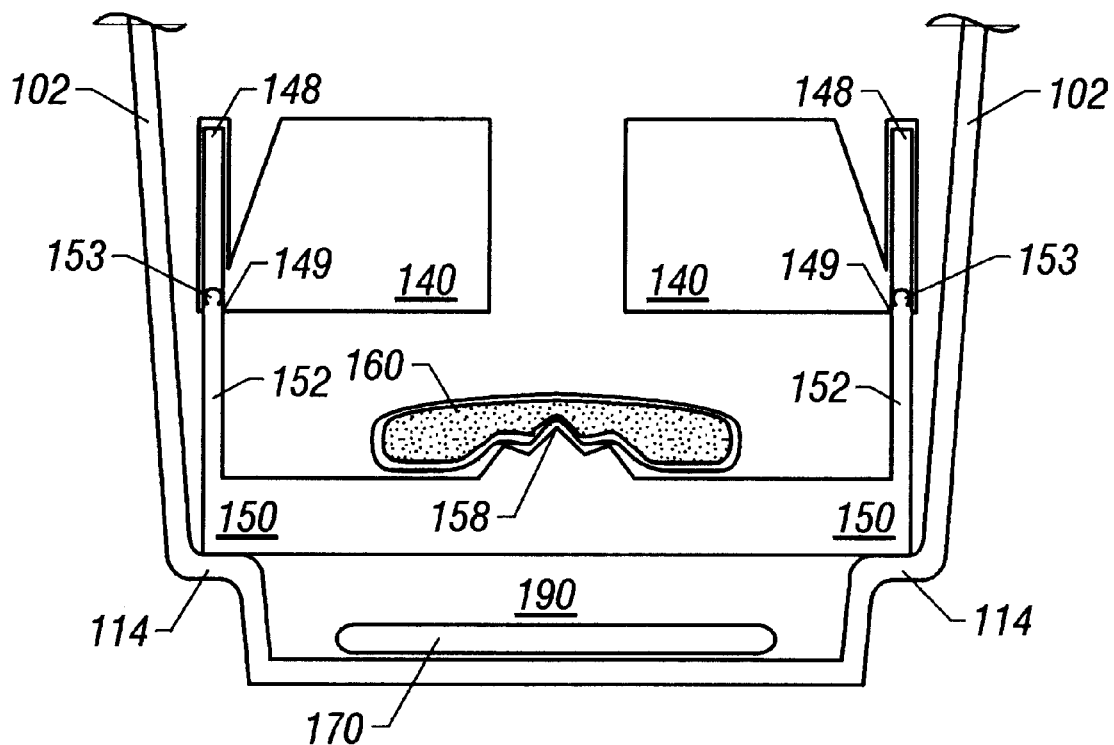
FIG. 6 is a cross-sectional view of the solution release mechanism situated in a lower section of the heating vessel, in a configuration with the upper and lower units spaced apart, with a solution bag situated between them.

Reference is now made to FIG. 6, which is a cross-sectional view of an assembled solution release mechanism, prior to actuation, situated in the bottom of the heating vessel 102. Briefly, in this configuration, the upper unit 140 is spaced apart from the lower unit 150, with the solution bag 160 situated therebetween. The heating element 170 is situated below the assembly. In order to properly situate the assembly within the vessel 102, the outer diameter of the lower unit 150 has a width sufficient to rest on the collar 114 formed in the lower section of the heating vessel. The collar 114 is designed to hold the solution release mechanism above the heating element 170, providing an air gap 190 between the heating element and the lower unit, to allow for expansion during the exothermic process of generating the heated gas.

As mentioned above, the alignment pins 152 each are formed with an annular indented ring 153 proximate their upper ends. The indented rings 153 have a shape to engage with the inner flanges 149 formed on the proximate side of the alignment holes 148, and prevent unwanted movement. In this "locked" position, the upper unit and lower units are spaced apart, and the solution bag is prevented from prematurely puncturing. In such a position, the solution release mechanism is conveniently safe for travel, carrying, and any other movements that would be desired. However, upon application of gentle pressure created by insertion of the baby bottle, as will be described, the locked configuration will be released to actuate the solution release mechanism.

Figure 7:
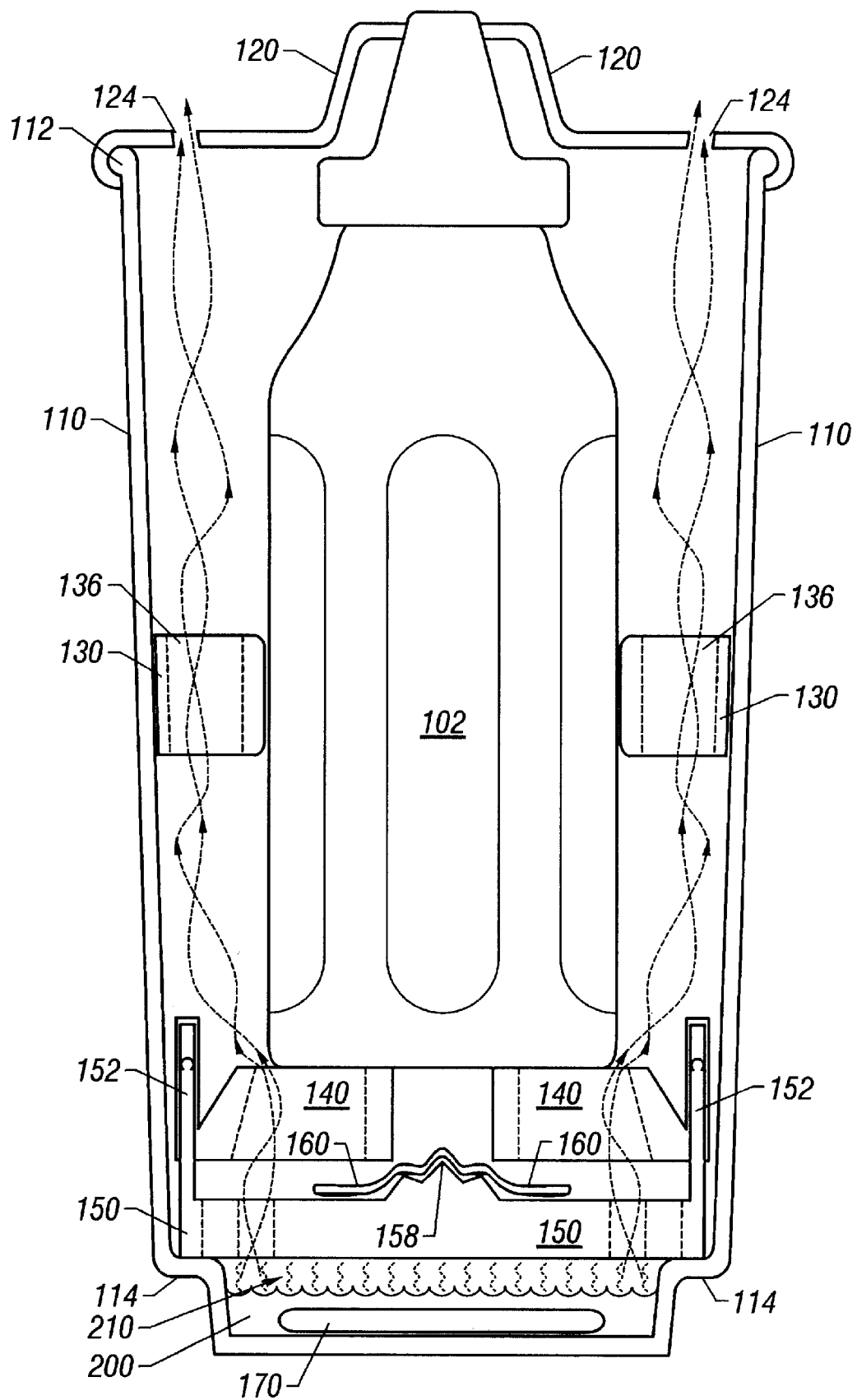
FIG. 7 is a cross-sectional view of the baby bottle warmer during the warming operation after the baby bottle has been inserted and the exothermic reaction has begun to generate heated gas.

FIG. 7 is a cross-sectional view of the upper and lower units being pressured together by insertion of the baby bottle. Particularly, inserting the baby bottle exerts pressure on the upper unit 140 sufficient to release the engaged rings and flanges, allowing the alignment pins 152 to move upwardly within the alignment holes. After sufficient travel into the alignment holes, the upper and lower units are sufficiently close that the solution bag 160 becomes punctured with the sharp tip 158 of the cone. The pressure between the upper and lower units causes the solution to exit from the bag, flowing downwardly through the holes in the lower unit and forming a liquid layer 200 over the heating element 170. The exothermic reaction between the solution and the heating element 170 generates a gas 210 that flows upwardly through the vents in the lower unit 150, around the solution bag 160, and then through vents in the upper unit 140, which has an inner conical section 142 (shown in FIG. 3) that concentrates the heated gas on the bottom of the bottle. From the bottom of the bottle, the gas then flows around the baby bottle in order to heat it, and a small amount exits the vents 124 in the vessel top 120. Much of the heat is retained within the walls of heating vessel, thereby effectively heating the bottle. When the reaction is completed, for example when the solution and/or the heating element is used up, the reaction is complete.

In one embodiment the solution container comprises a two mil bag of saline solution, and the heating element is a magnesium wafer. In this embodiment, after the saline solution is released onto magnesium wafer, the saline solution is absorbed by the magnesium wafer starting an exothermic reaction. The exothermic reaction creates heated gas that rises through the release mechanism. The heated gas has a temperature of approximately 190° Fahrenheit and continues to be generated for about five minutes. During this time, the bottle's content may be warmed to approximately 102° degrees Fahrenheit. The heated gas escaping from top of vessel comprises a non-toxic hydrogen gas, and the vents 124 on the vessel top prevent explosive buildup.

ALTERNATIVE EMBODIMENTS

It will be appreciated by those skilled in the art, in view of these teachings, that alternative embodiments may be implemented without deviating from the spirit or scope of the invention. For example, the alignment pins and holes may be reversed; i.e., the alignment pins may be formed on the upper unit and the alignment holes in the lower unit. In alternative embodiments, other mechanical devices can be used to separate the upper and lower units during travel or other movement. The solution release mechanism may comprise alternative configurations, for example the upper and lower units may be connected by a hinge that is biased in the open direction. The puncturing device may comprise spikes or another puncturing mechanism on the upper and/or lower units, either in addition to or instead of the sharp tip of the cone on the lower unit. The solution container may comprise a plastic bag or some other configuration that holds the liquid solution. This invention is to be limited only by the following claims, which include all such embodiments and modifications when viewed in conjunction with the above specification and accompanying drawings.

What is claimed is:

1. A method of heating a baby bottle, comprising:
providing a heating element and a solution container for a solution that reacts with said heating element to generate heat in an exothermic reaction;
inserting the solution container into a release mechanism between an upper unit and a lower unit of said release mechanism;
situating said release mechanism and said heating element within a heat-insulating vessel so that said heating element is arranged below said solution bag;
inserting said baby bottle into said heating vessel and pressuring said release mechanism, thereby actuating said release mechanism by pressuring said upper unit and said lower unit together to puncture said solution container and release said solution to flow downwardly into contact with said heating element thereby generating heat in an exothermic reaction between said solution and said heating element; and
removably attaching a vessel top to said heating vessel to contain the heat from said exothermic reaction within said heating vessel.

2. The method of claim 1 further comprising spacing apart said lower and upper units by engaging a plurality of alignment pins with a corresponding plurality of alignment holes, and then upon application of said pressure, disengaging said alignment pins and allowing said alignment pins to move into said alignment holes.

3. The method of claim 1 further comprising the step of using a sharp tip of a cone formed in the lower unit to puncture said solution container and release said solution.

4. A baby bottle warmer that generates an exothermic reaction to heat a baby bottle with a heated gas, comprising:
a heating vessel for holding said baby bottle;
a vessel top that removably attaches to an upper section of said heating vessel;
a solution release mechanism situated in a lower section of said heating vessel, comprising
a solution container having an activating liquid disposed therein;
means for puncturing said solution container responsive to pressure supplied by insertion of said baby bottle into said lower section of said heating vessel;
a heating element situated below said solution release mechanism, said heating element comprising a material for exothermically reacting with said liquid to generate said heated gas.

5. The baby bottle warmer of claim 4 wherein said heating vessel comprises a heat-insulating material.

6. The baby bottle warmer of claim 4 and further comprising a positioning ring situated within said heating vessel, said positioning ring configured to position said baby bottle approximately centrally within said heating vessel, said positioning ring defining a plurality of holes to allow passage of said heated gas.

7. The baby bottle warmer of claim 4 wherein said vessel top defines a configuration for engaging a top portion of said baby bottle.

8. The baby bottle warmer of claim 4 wherein said heating element comprises magnesium and iron, and said activating solution comprises an electrolyte.

9. The baby bottle warmer of claim 4 wherein said heating element comprises an integrated sintered composite structure of blended powdered polymeric material and supercorroding metallic alloy powders dispersed through in the form of a porous matrix.

10. The baby bottle warmer of claim 4 wherein said solution release mechanism comprises:
   a lower unit;
   an upper unit; and
   a puncturing device coupled to at least one of said lower and upper units;
   wherein said solution container is situated between said upper and lower units, so that said solution container is punctured by said puncturing device responsive to pressure supplied by insertion of said baby bottle.

11. The baby bottle warmer of claim 10 further comprising means for spacing apart said lower and upper units in the absence of pressure, and then upon insertion of said baby bottle and corresponding application of pressure to said upper unit, disengaging said upper and lower units and allowing said upper and lower units to move in a direction toward each other.

12. The baby bottle warmer of claim 11 further comprising:
   a plurality of alignment pins coupled to one of said upper and lower units;
   a plurality of alignment holes formed in the other of said upper and lower units to receive said alignment pins; and
   said alignment pins each having a indented ring and said alignment holes having an inner flange that engage said indented rings such that said upper and lower units are initially spaced apart to avoid unintended puncture of said solution container, and upon application of downward pressure to said release mechanism, said indented ring and said inner flange disengage, said alignment pins move axially within said alignment holes, and said puncturing device punctures said solution container and releases said activating liquid.

13. A baby bottle warmer that generates an exothermic reaction to heat a baby bottle with a heated gas, comprising:
   a heating vessel for holding said baby bottle, said heating vessel comprising a heat-insulating material;
   a positioning ring disposed within said heating vessel to position said baby bottle approximately centrally within said heating vessel, said positioning ring defining a plurality of holes to allow passage of said heated gas;
   a vessel top that removably attaches to an upper section of said heating vessel;
   a solution release mechanism situated in a lower section of said heating vessel, comprising
   a lower unit including a centrally-positioned cone having a sharp tip that extends upwardly and a plurality of upwardly-extending alignment pins, said lower unit defining a plurality of holes to allow passage of said heated gas,
   an upper unit that defines a plurality of alignment holes arranged to receive said alignment pins, said upper unit including a plurality of holes to allow passage of said warm gas;
   a solution container having an activating liquid disposed therein, said solution container situated between said upper and lower units;
   said alignment pins each having a indented ring and said alignment holes having an inner flange that engage said indented rings such that said upper and lower units are initially spaced apart to avoid puncture of said solution container, and upon application of downward pressure to said release mechanism, said indented ring and said inner flange disengage and said alignment pins move axially within said alignment holes, and said sharp tip of said cone punctures said solution container and releases said activating liquid; and
   a heating element situated below said solution release mechanism, said heating element comprising a material for exothermically reacting with said activating liquid to generate said heated gas;
   wherein insertion of said baby bottle into said vessel actuates said release mechanism to puncture said solution bag with said sharp tip of said cone, thereby allowing said solution to flow downwardly to react with said heating element.

14. The baby bottle warmer of claim 13 wherein said vessel top includes a configuration for holding a top portion of said baby bottle.

15. The baby bottle warmer of claim 13 wherein said heating element comprises magnesium and iron, and said activating solution comprises an electrolyte.

16. The baby bottle warmer of claim 13 wherein said heating element comprises an integrated sintered composite structure of blended powdered polymeric material and supercorroding metallic alloy powders dispersed through in the form of a porous matrix.

17. The baby bottle warmer of claim 13 wherein said vessel comprises a cylindrical shape, said positioning ring comprises a cylindrical shape, and said upper and lower units comprise a cylindrical shape.

* * * * *